United States Patent
Barlow et al.

(10) Patent No.: US 6,839,079 B2
(45) Date of Patent: Jan. 4, 2005

(54) VIDEO-TELEPHONY SYSTEM

(75) Inventors: Stephen Barlow, Cambridge (GB); Timothy Ramsdale, Cambridge (GB); Robert Swann, Cambridge (GB); Neil Bailey, Cambridge (GB); David Plowman, Saffron Walden (GB)

(73) Assignee: Alphamosaic Limited, Saffron Walden (GB)

(*) Notice: Subject to any disclaimer, the term of this patent is extended or adjusted under 35 U.S.C. 154(b) by 0 days.

(21) Appl. No.: 10/284,307

(22) Filed: Oct. 31, 2002

(65) Prior Publication Data

US 2003/0160861 A1 Aug. 28, 2003

(30) Foreign Application Priority Data

Oct. 31, 2001 (GB) .............................................. 0126139

(51) Int. Cl.[7] .................................................. H04N 7/14
(52) U.S. Cl. ................ 348/14.02; 348/14.05; 379/90.01; 455/555
(58) Field of Search .................... 348/14.01–14.16; 455/556.1–557, 550.1; 379/90.01, 110.01, 93.01, 93.05–93.08

(56) References Cited

U.S. PATENT DOCUMENTS

| | | | |
|---|---|---|---|
| 5,760,824 A | | 6/1998 | Hicks, III |
| 6,069,648 A | * | 5/2000 | Suso et al. ............... 348/14.02 |
| 6,208,379 B1 | | 3/2001 | Oya et al. |
| 6,314,302 B1 | * | 11/2001 | Haferbeck et al. ....... 455/550.1 |
| 6,671,520 B1 | * | 12/2003 | Kim ......................... 348/14.02 |

FOREIGN PATENT DOCUMENTS

| | | |
|---|---|---|
| GB | 2 332 055 A | 6/1999 |
| JP | 5-316504 A | 11/1993 |

* cited by examiner

Primary Examiner—Wing F. Chan
(74) Attorney, Agent, or Firm—Sughrue Mion, PLLC

(57) ABSTRACT

A video-telephony system comprising a plurality of cameras, each capable of generating a video signal; a plurality of display units which are able to receive video signals from the cameras via a wireless link; a plurality of telephones which are able to communicate with each other; means for identifying a camera convenient for a user of a first one of the telephones; and means for transmitting a video signal generated by the camera to a display unit convenient for a user of a second one of the telephones engaged in a call with the first one of the telephones.

15 Claims, 1 Drawing Sheet

VIDEO-TELEPHONY SYSTEM

This invention relates to video-telephony systems, for example for displaying to each person engaged in a telephone call an image of each other person engaged in that call.

In a first type of conventional video-telephony (video-conferencing) system, cameras are in a fixed position, and a particular fixed camera is associated with a particular fixed display unit, with fixed line connections between the cameras at one end of the call and the display units at the other end. These systems have a number of disadvantages, some of which are described below.

Firstly, a person wishing to make a call using a video-telephony system must be in a room containing the necessary connections and the necessary equipment, i.e. a telephone, a camera and a display unit. This is obviously limiting. The call would need to be arranged in advance in order for both people to have the equipment available to them.

Secondly, each person would be restricted to a particular location, i.e. in front of a fixed camera, for the duration of the call.

Thirdly, before the call takes place, each caller must ensure that his camera is connected up to generate an image of himself, and that the display unit is enabled to receive an image signal from the camera to be used by the other caller.

In addition, the fact that the connections are via fixed lines requires the presence of unsightly and obstructive cables.

A second type of video-telephony system has been envisaged, in which cameras and display units are integrated into mobile telephones. However, for the mobile phone to be arranged so that the camera can capture a satisfactory image of the user and at the same time the user can view the display whilst holding the telephone to his ear or mouth, the phone would have to be of a most unwieldy configuration.

With both of these types of system, there is the problem of centring the face of a caller with respect to the field of view of the camera, and having the correct zoom setting on the camera, so that the image received at the other caller's display unit is well framed.

According to one aspect of the present invention there is provided a video-telephony system comprising: a plurality of cameras, each capable of generating a video signal; a plurality of display units which are able to receive video signals from the cameras via a wireless link; a plurality of telephones which are able to communicate with each other; means for identifying a camera convenient for a user of a first one of the telephones; and means for transmitting a video signal generated by the camera to a display unit convenient for a user of a second one of the telephones engaged in a call with the first one of the telephones.

According to a second aspect of the present invention there is provided a method for executing a call within a video-telephony system comprising a plurality of cameras, each capable of generating a video signal; a plurality of display units which are able to receive video signals from the cameras via a wireless link; and a plurality of telephones which are able to communicate with each other; the method comprising the steps of: identifying a camera convenient for a user of a first one of the telephones; and transmitting a video signal generated by the camera to a display unit convenient for a user of a second one of the telephones engaged in a call with the first one of the telephones.

The present invention will now be described in detail with reference to the accompanying drawings, in which.

Figure 1:
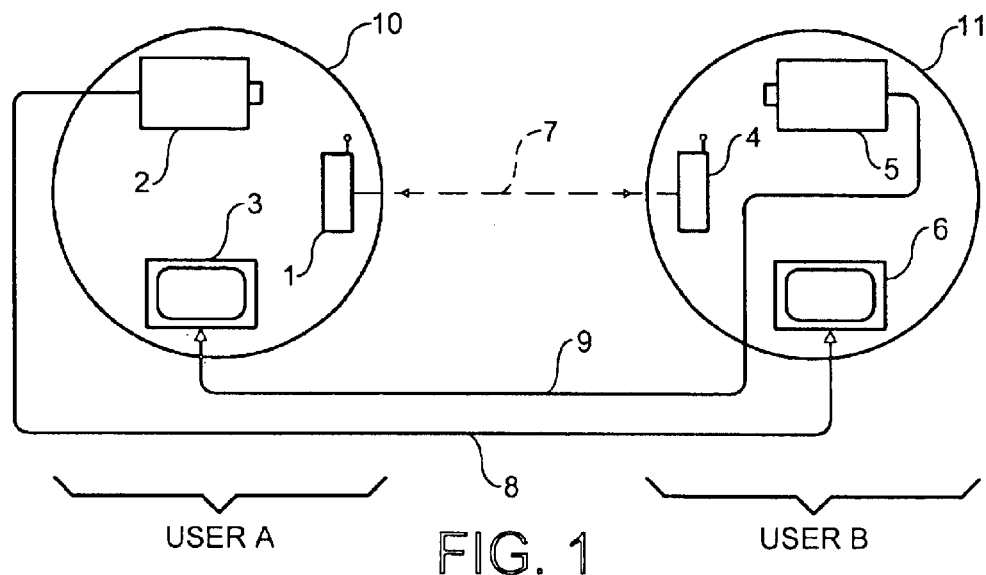
FIG. 1 shows diagrammatically a call in progress involving two users.

In the system shown in FIG. 1, a user A is provided with a mobile telephone which can communicate via a wireless telephony system with other telephones, and via a wireless data connection with a nearby camera. The mobile phone supports a video-telephony application whereby, when the mobile phone is engaged in a call with a telephone that is associated with a video display, the mobile phone can establish a data connection to the camera and cause data to be sent from the camera to the display associated with the other telephone. The nearby camera is not dedicated for use by the mobile phone: when appropriate it can be employed by other mobile phones.

The video-telephony application of the mobile phone is capable of checking for cameras in the vicinity of the mobile phone, suitably by means of broadcast signals. When a suitable camera is detected it can be adopted by the mobile phone and employed as described above to cause data to be sent to the display.

In more detail, the group of elements 10 in FIG. 1 is used by a first user, user A, during a video-telephone call between user A and a second user, user B. The group 10 comprises a telephone 1, a camera 2 and a display unit 3. The group of elements 11 is used by user B, and comprises a telephone 4, a camera 5 and a display unit 6. During the call, the video signal of an image of user A is transmitted from camera 2 to display unit 6 via a wireless link 8. Similarly, a signal is sent from camera 5 over a wireless link 9 to display unit 3. Wireless links 8 and 9 preferably use the same protocol. Telephones 1 and 4 communicate over link 7, which may or may not be wireless. Link 7 preferably uses a different protocol from that used for transmission of the data from the cameras.

Figure 2:
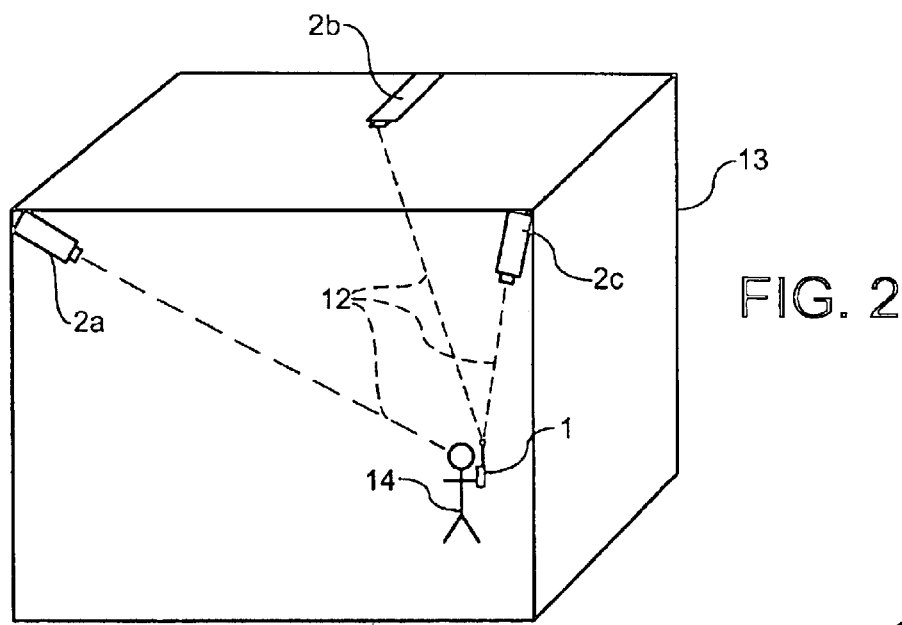
FIG. 2 shows a room containing three cameras.

FIG. 2 shows an embodiment of one aspect of the invention in which a telephone 1 in a room 13 is surrounded by a series of cameras 2a–2c contained in the room. During a video-telephone call involving telephone 1, one of the cameras 2a–2c will be required to generate an image of the caller 14 using telephone 1.

The selection of a convenient camera may be achieved in a number of ways. For example, as shown in FIG. 2, signals 12 may be transmitted between each camera 2a–2c and the telephone 1. In this example, the signals between the cameras 2a–2c and the telephone 1 are analysed, suitably by a device in the telephone 1, to determine which of the cameras is convenient to telephone 1, and hence also to caller 14. The criteria for selection could be, for example, distance of the telephone from the camera, whether the camera is already in use by another caller, whether the field of view of the camera includes the telephone, or any combination of the above.

Figure 3:
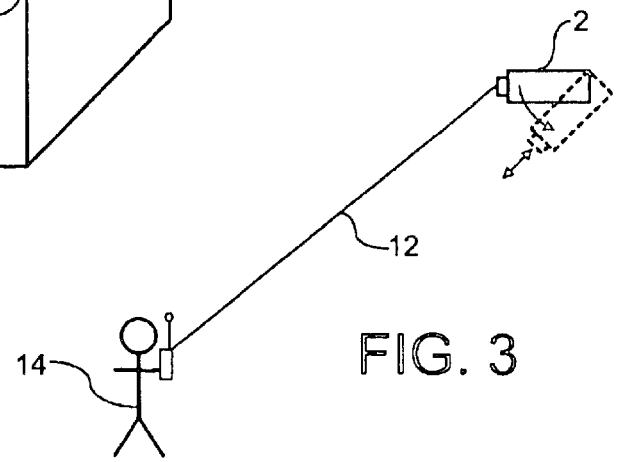
FIG. 3 shows a camera adjusting its position and zoom in response to signals from a telephone.

In one embodiment of the present invention, after a convenient camera has been identified for use by the caller 14, the camera may then, in response to signals from the telephone 1, adjust its position or zoom to improve its image of the caller 14. This embodiment is represented in FIG. 3, which shows the camera 2 adjusting its field of view. The position and zoom adjustment could be performed by the camera, which could detect the location of the telephone 1 from the signals transmitted to it by the telephone and adjust accordingly. Alternatively, the adjustments could be made by the user transmitting control signals to the camera using his telephone, for instance after viewing the video output on his telephone.

Preferably, more than two callers can be engaged in a single call. Video signals of one caller may be transmitted to all the other callers.

Preferably, more than one call can take place simultaneously within the system.

The video data from a camera could be transmitted to the display of another caller by way of the telephones used in the call. For this type of operation the camera sends the video data it generates to the telephone that has adopted it. This is preferably done by a wireless data link, between the camera and the telephone. Then the telephone transmits the video data to the other telephone(s) engaged in the call by means of the telephone link between them. The other telephone(s) receive the video data and pass it to a local video display for display to a user. Alternatively, another link could be used to transmit the video data from the camera to the display. For example, the cameras and the display could be connected to a fixed line network. When a call is established the telephone of each party having a display transmits to the telephone of each other party the address in the fixed line network of its display. Then the cameras of the other parties can establish a call to the displays over the fixed line network, and can use that network to send the video data to the displays.

The video signal from a camera may consist of a series of still images or may be sent in a compressed video format such as MPEG.

Suitably, a camera could be capable of indicating to a user near the camera, for example by means of a light, that an image of its field of view is being transmitted.

A caller could suitably be able to move around during the call. If the caller's telephone moves out of the field of view of a first camera and into the field of view of a second camera, a video signal to be received by a display unit could be transmitted first from the first camera, and then from the second camera, according to the position of the telephone. To achieve this the telephone could periodically check for convenient cameras nearby, and if it finds a camera that is more convenient than the one it has currently adopted, adopt the more convenient camera and release the first camera.

The telephones in use in the system could be fixed line or mobile telephones, or a combination of both.

The links between the cameras and the local telephones are suitably infra-red or low-power radio frequency (e.g. Bluetooth) links. The links between the telephones are suitably land-line and/or radio telephone links, for example GSM (Global System for Mobile Communications) or 3G (third generation)/UMTS (Universal System for Mobile Telecommunications) links. If the cameras are able to send video signals directly to the display, they preferably do so by means of a fixed network such as the internet.

It can be envisaged that for convenient operation of the system described above, cameras could be positioned at suitable locations, such as in offices, on the sides of buildings, at bus stops and in vehicles. Then, when a user near such a camera wants to make a video call his telephone adopts the nearby camera for generating video signals to be sent to the other party/parties in the call, This has the advantages that the user's telephone need not include a video camera, and that the image that is generated of the user can be taken from a location that is sufficiently distant from the user that the user can be properly framed in the picture.

It should be noted that it is not necessary for all callers to have access to a camera and a display unit. For example, a call could take place in which a first user has access to a convenient camera, but does not have access to a display unit, and a second user has access to a display unit but not to a camera.

The applicant draws attention to the fact that the present inventions may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

What is claimed is:

1. A video-telephony system comprising:
   a plurality of cameras, each capable of generating a video signal;
   a plurality of display units which are able to receive video signals from the cameras via a wireless link;
   a plurality of telephones which are able to communicate with each other;
   means for identifying, based on the location of a first one of the telephones, a camera convenient for a user of that one of the telephones; and
   means for transmitting a video signal generated by the camera to a display unit convenient for a user of a second one of the telephones engaged in a call with the first one of the telephones.

2. A video-telephony system as claimed in claim 1, comprising a second camera convenient for the user of the second one of the telephones, and wherein the video signal from the second camera is transmitted to a display unit convenient for the user of the first one of the telephones.

3. A video-telephony system as claimed in either of claims 1 or 2, wherein the cameras and the display units are wirelessly linked to the telephones so that a camera can communicate with a display unit via a telephone when the telephone is engaged in a call.

4. A video-telephony system as claimed in claim 1, wherein the first one of the telephones comprises the said means for identifying.

5. A telephony system as claimed in claim 1, wherein each telephone in the system comprises means for identifying a camera convenient for a user of the telephone.

6. A video-telephony system as claimed in claim 1, wherein the camera convenient for a user is one which has in its field of view the telephone in use by the user.

7. A video-telephony system as claimed in claim 1, wherein the means for identifying is arranged to identify as the camera convenient for a user a camera which, not already in use by a different user, is nearest to the telephone in use by the user.

8. A video-telephony system as claimed in claim 1, wherein the display units are each integrated into a different one of the telephones.

9. A video-telephony system as claimed in claim 1, wherein users of further ones of the telephones may also be engaged in the call.

10. The video-telephony system claimed in claim 9, comprising means for transmitting video signals generated by cameras convenient to any users of further ones of the telephones to display units convenient for each other user engaged in the call.

11. A video-telephony system as claimed in claim 1, wherein two or more calls can take place simultaneously within the system.

12. A video-telephony system as claimed in claim 1, wherein each one of the cameras is capable of communicating with each of the telephones in the system via a wireless link.

13. A video-telephony system as claimed in claim 1, wherein at least one of the cameras can adjust its field of view, or zoom in or out, according to a control signal from a telephone to which the camera is convenient.

14. A video-telephony system as claimed in claim 1, wherein communication between two or more telephones is by a first protocol and communication between cameras and display units, or cameras and telephones, is by a different protocol.

15. A method for executing a call within a video-telephony system comprising a plurality of cameras, each capable of generating a video signal; a plurality of display units which are able to receive video signals from the cameras via a wireless link; and a plurality of telephones which are able to communicate with each other; the method comprising the steps of: identifying, based on the location of a first one of the telephones, a camera convenient for a user of said one of the telephones; and transmitting a video signal generated by the camera to a display unit convenient for a user of a second one of the telephones engaged in a call with the first one of the telephones.

\* \* \* \* \*